United States Patent
Oguri et al.

(10) Patent No.: US 7,263,575 B2
(45) Date of Patent: Aug. 28, 2007

(54) ELECTRONIC CONTROL DEVICE

(75) Inventors: Takamasa Oguri, Toyoake (JP);
Takaaki Baba, Chita-gun (JP)

(73) Assignee: DENSO Corporation, Kariya (JP)

( * ) Notice: Subject to any disclaimer, the term of this patent is extended or adjusted under 35 U.S.C. 154(b) by 250 days.

(21) Appl. No.: 10/441,172

(22) Filed: May 20, 2003

(65) Prior Publication Data

US 2003/0221049 A1    Nov. 27, 2003

(30) Foreign Application Priority Data

May 21, 2002    (JP)    .............................. 2002-146772

(51) Int. Cl.
*G06F 12/00*    (2006.01)
(52) U.S. Cl. ........................ 711/103; 711/154; 711/163; 711/145; 365/185.03
(58) Field of Classification Search ................ 711/103, 711/154, 163, 145; 365/185.04, 185.33, 365/196
See application file for complete search history.

(56) References Cited

U.S. PATENT DOCUMENTS

| | | | | |
|---|---|---|---|---|
| 5,778,444 A | * | 7/1998 | Langan et al. | ............... 711/163 |
| 5,925,139 A | * | 7/1999 | Yamada et al. | ............... 714/14 |
| 6,453,397 B1 | * | 9/2002 | Okuda | ........................ 711/163 |
| 2002/0191438 A1 | * | 12/2002 | Shukuri | ................. 365/185.05 |

FOREIGN PATENT DOCUMENTS

| JP | 11-120085 | 4/1999 |
|---|---|---|
| JP | 11-306009 | 11/1999 |
| JP | 2000-337209 | 12/2000 |

* cited by examiner

*Primary Examiner*—Kimberly McLean-Mayo
(74) *Attorney, Agent, or Firm*—Nixon & Vanderhye P.C.

(57) ABSTRACT

An ECU includes a microcomputer that has an integrated flash memory. An initial writing flag is set in the microcomputer before an initial writing to the flash memory. The microcomputer enters into a writing mode when the flag determines permission of data writing. When the data-writing to the flash memory is completed, the flag is cleared.

11 Claims, 3 Drawing Sheets

ELECTRONIC CONTROL DEVICE

CROSS REFERENCE TO RELATED APPLICATION

This application is based on and incorporates herein by reference Japanese Patent Application No. 2002-146772 filed on May 21, 2002.

FIELD OF THE INVENTION

The present invention relates to an electronic control device.

BACKGROUND OF THE INVENTION

A known electronic control device (onboard ECU) for controlling an engine includes a microcomputer and a flash memory. In this ECU, the microcomputer is set to a writing mode to write control programs or control data to the memory. The mode is set by an external program-writing device. The program-writing device is a fixture having multiple probe pins. It sets the microcomputer to the writing mode by an electrical trigger. More specifically, the microcomputer is electrically connected to the program-writing device via the probe pins and set to the writing mode.

Referring to FIG. 5, the ECU is manually connected to the program-writing device (P11) and set to the writing mode by the program-writing device (P12). Necessary data is transmitted from the program-writing device to the ECU (P13) and the data is sequentially written to the flash memory (P14). When completed, the ECU is disconnected from the program-writing device and connected to an inspection device (P15). The inspection device inspects the data in the flash memory (P16). If an error is detected, it is reported to the operator for prompting to take action, such as parts replacement, to fix the error (P17).

Since the data in the flash memory is important information, especially the control programs contains information necessary for controlling the ECU, it should be protected. Therefore, a mode of writing data to the memory is set to prevent unintentional mode switching.

When data is written to the ECU in this device, an external program-writing device is required. Therefore, the facility cost and the amount of work including device setups become issues. Especially, when the mode is set via the probe pins, a designated device for setting probe pin positions is required for each ECU.

SUMMARY OF THE INVENTION

The present invention therefore has an objective to provide an electronic control device in which data is properly written to a nonvolatile memory without complicated machinery and work procedures. In an electronic control device of the present invention, data is written to a nonvolatile memory by an external device under the condition that a predetermined writing mode is set. A flag for permitting or inhibiting the data writing to the memory is set in the microcomputer. When the flag is set to a state of permitting the data writing, the mode is determined as a writing mode. When the data writing is completed, the flag is cleared.

Since the writing mode is determined only by referring to the flag, an external program-writing device is not required for setting up the mode. This simplifies facilities and reduces an amount of work required for machine setups. Moreover, the flag is cleared when the data writing is completed, and the data writing is inhibited afterwards. This prevents unintentional switching to the writing mode, which may cause overwriting the memory 12. Therefore, the data writing to the memory 12 is properly performed. The facilities and work procedures can be also simplified through the usage of the flag.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings.

First Embodiment

Figure 1:
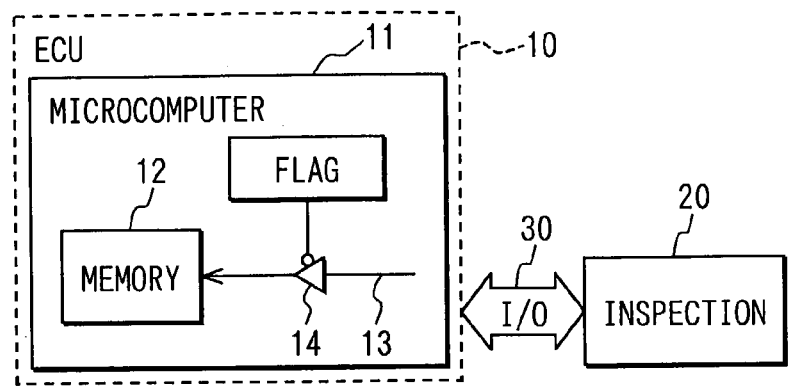
FIG. 1 is a block diagram of an electronic control device according to the first and the other embodiments of the present invention.

Referring to FIG. 1, an electronic control unit (ECU) 10 used for engine control or transmission control has a microcomputer 11. The microcomputer 11 has an integrated flash memory 12 in which various data, including control programs and control data, is stored. The flash memory 12 is a nonvolatile memory, which is electrically rewritable. The data is written to the memory 12 by an external device via a data signal line 13.

Data writing to the memory 12 is permitted only when a writing mode is determined. More specifically, a gate circuit 14 is provided in the signal line 13, and the data is written to the memory 12 when the gate circuit 14 is active. An initial writing flag is set to indicate that no data is written in the memory 12 when the microcomputer 11 is installed in the ECU 10. The gate circuit 14 is switched between an active state and a negative state based on the flag.

The gate circuit 14 becomes active under the condition that the flag is set, and the data-writing to the memory 12 is permitted. An inspection device 20, which is an external device, is connected to the ECU 10. A controller area network (CAN) communication is used for data input/output between the ECU 10 and the inspection device 20 via a data signal line 30. The CAN communication enables data transfer at a rate faster than the serial communication interface (SCI) communication. The inspection device 20 inspects the data written in the memory 12 by a checksum. The data is also read from the ECU 10 to the memory 12 upon a request issued by the ECU 10.

If a speed at which the ECU 10 receives the data from the inspection device 20 is faster than a speed at which the data is written to the memory 12, the data may not be properly written. Communication weight logic is used to reduce such problems. In the communication weight logic, an appropriate data transfer speed can be set for the inspection device 20.

Figure 2:
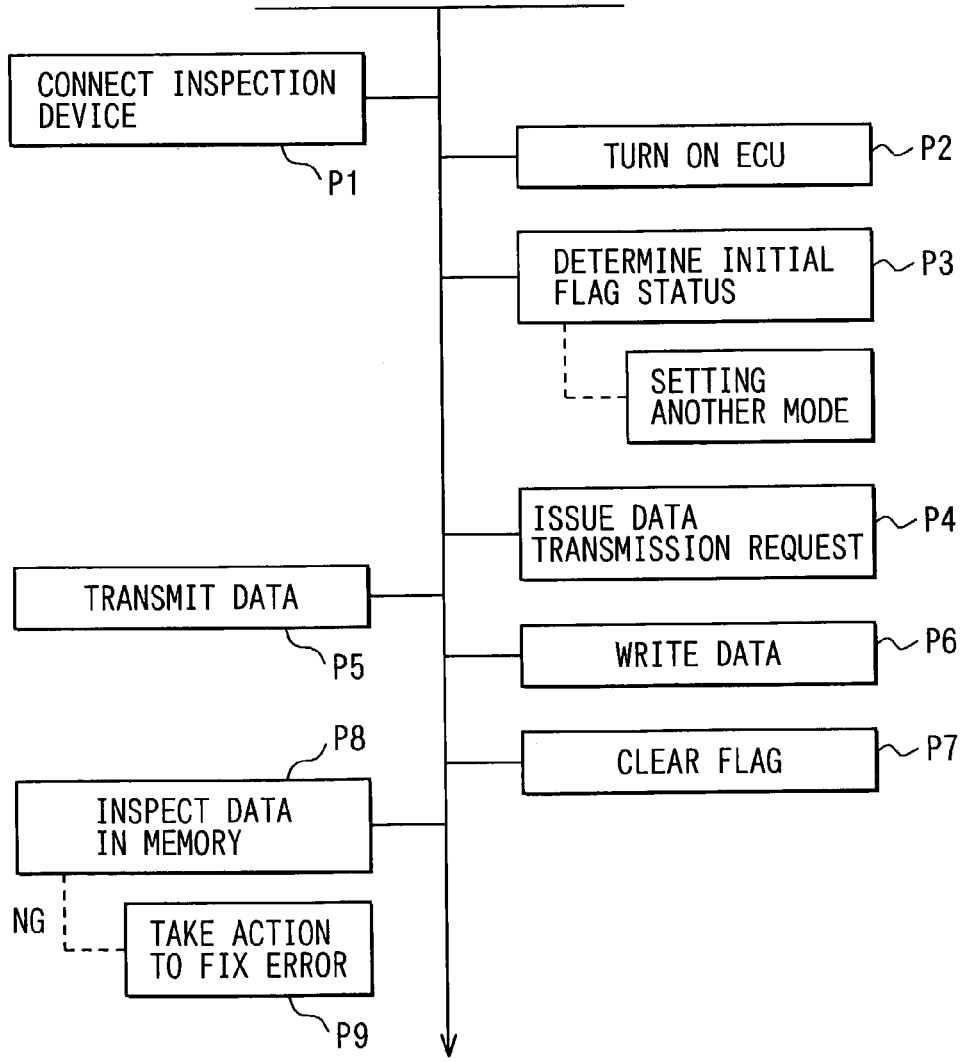
FIG. 2 is a flowchart of a process of writing data to a flash memory.

Referring to FIG. 2, the inspection device 20 is manually connected to the ECU 10 (P1). A power source to the ECU 10 is turned on (P2), and a status of the initial writing flag is determined (P3). If it is the initial writing to the memory 12, the initial writing flag is supposed to be set. Therefore, the writing mode is set in the next step when the status of the flag is determined set. If the status of the flag is determined cleared, the initial writing is supposed to be completed, that is, the microcomputer 11 is supposed to be programmed. In this case, a program for setting a different mode is executed. The microcomputer 11 is reprogrammed upon a request.

Figure 3:
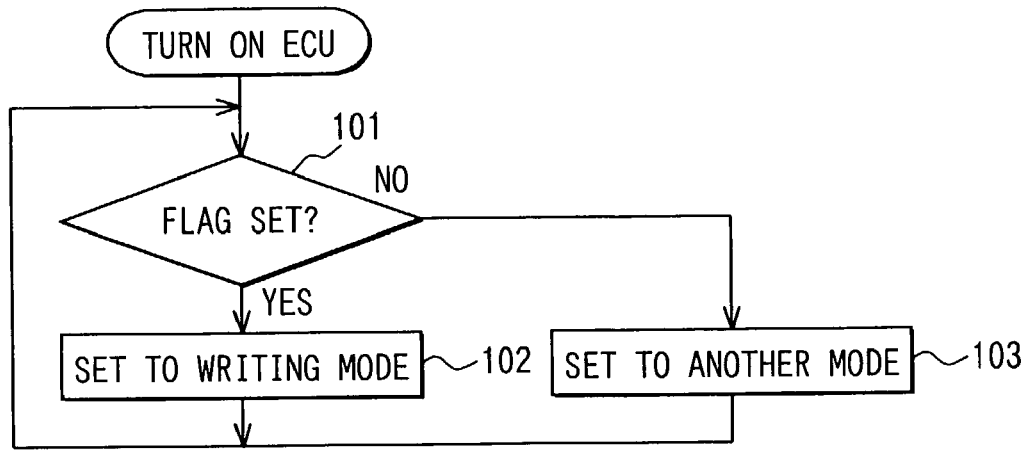
FIG. 3 is a flowchart of a data-writing process performed by a microcomputer after a power is turned on according to the first embodiment.

FIG. 3 is a flowchart of the program executed by the microcomputer 11 to determine the status of the flag. After the power source is turned on, it is determined whether the initial writing flag is set (step 101). If it is determined that the flag is set, the writing mode is set (step 102). If it is determined that the flag is cleared, a different mode is set (step 103).

When the writing mode is set, the microcomputer 11 issues a request for data transmission (P4). The inspection device 20 sends requested data to the ECU 10 according to the issued request (P5). In the microcomputer 11, the received data is sequentially written to the memory 12 (P6). When all requested data is written in the memory 12, the initial writing flag is cleared (P7).

In the inspection device 20, the data written in the memory 12 is inspected (P8). If an error is detected, error information is reported to an operator for prompting to take action, such as parts replacement (P9). This inspection can be performed by the microcomputer 11 instead of the inspection device 20.

With this configuration, whether the mode is set to the writing mode is determined only by detecting the initial writing flag. Therefore, external devices, such as a program-writing device, are not required for setting the mode. This simplifies facilities and reduces an amount of work for machine setups.

Furthermore, the data writing is inhibited after the initial writing is completed and the initial writing flag is cleared. This prevents unintentional switching to the writing mode, which may cause overwriting the memory 12. Therefore, the data writing to the memory 12 is properly performed, especially at the initial writing during the installation of the microcomputer 11 into the ECU 10. The mode is selected based on the status of the initial writing flag. Thus, the microcomputer 11 is set to the proper mode at each time.

Second Embodiment

Figure 4:
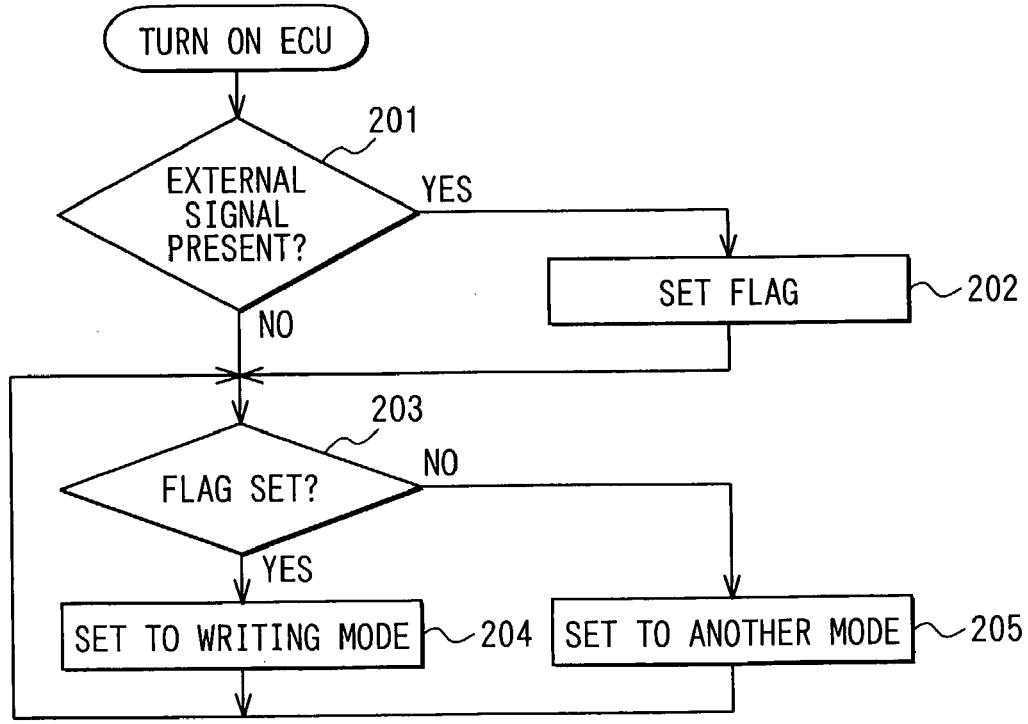
FIG. 4 is a flowchart of a data-writing process performed by the microcomputer after a power is turned on according to the second embodiment.
Figure 5:
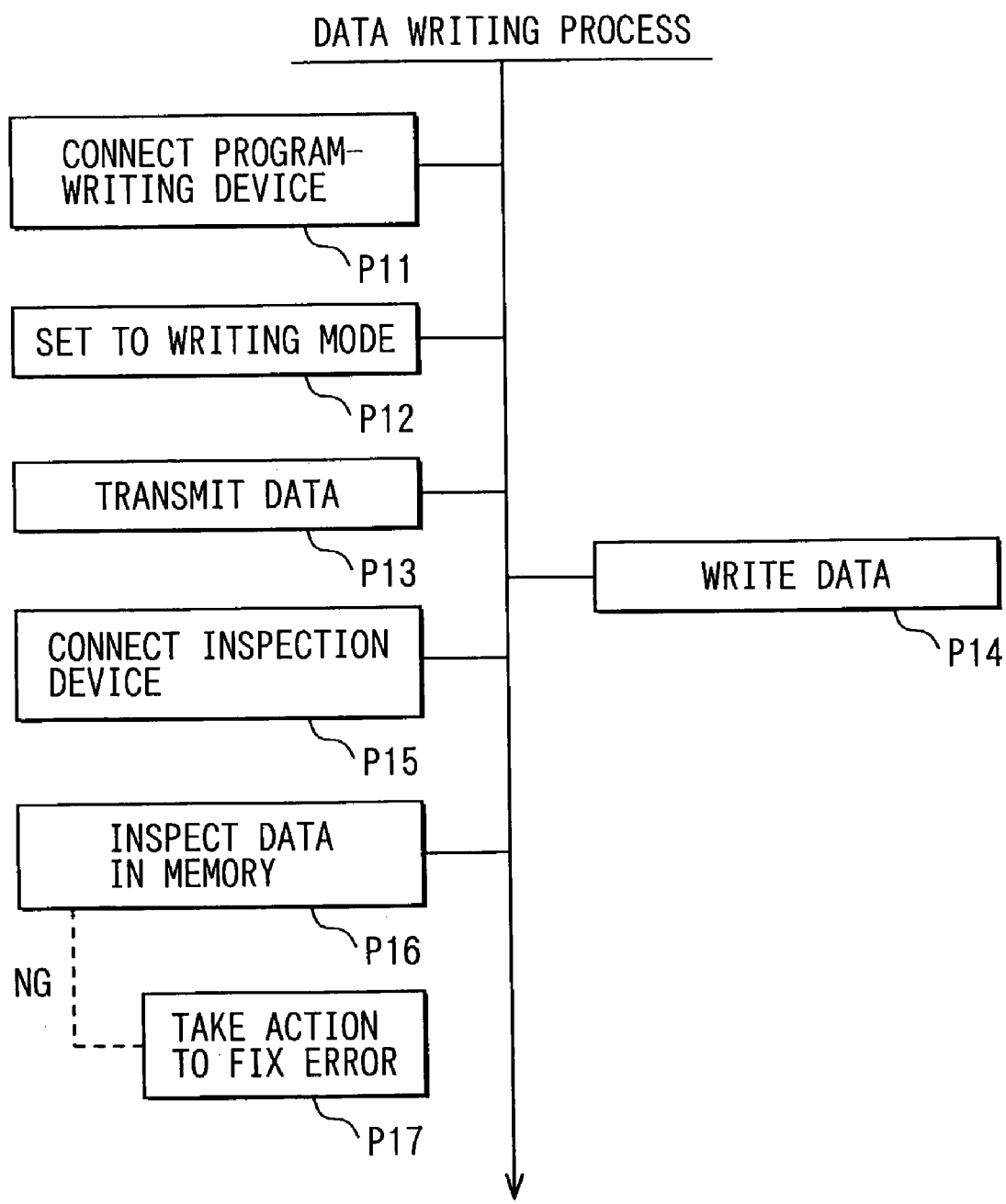
FIG. 5 is a flowchart of a process of writing data to a flash memory.

FIG. 4 is a flowchart of the program executed by the microcomputer 11 to determine the status of the flag. In the first step, it is determined whether an electrical signal is inputted from an external device (step 201). If the electrical signal is detected, the initial writing flag is set (step 202). If the electrical signal is not detected, it is determined whether the initial writing flag is set (step 203). If the flag is set, the writing mode is set in the next step (step 204). If the flag is cleared, a different mode is set (step 205). In this embodiment, the initial writing flag is used to indicate not only for the initial writing but also for all writing permission or inhibition.

This embodiment is useful in a case that programs stored in the memory 12 need to be modified or reprogrammed. In such a case, the initial writing flag needs to be reset for setting the mode back to the writing mode. To reset the flag, the electrical signal is inputted from the external device. The external device may be the inspection device 20 or other mode-setting device. With this configuration, the modification or reprogramming, that is, rewriting data to the memory 12 can be made properly. Furthermore, the flag is reset only when the electrical signal is inputted. Therefore, the improper writing due to unintentional setting of the flag is less likely to happen.

The present invention should not be limited to the embodiment previously discussed and shown in the figures, but may be implemented in various ways without departing from the spirit of the invention. For example, an EEPROM can be used instead of the memory 12. The flag may be reset for rewriting when an error is detected during the inspection of the data in the memory 12.

What is claimed is:

1. An electronic control device comprising:
   a microcomputer; and
   an electrically rewritable memory associated with the microcomputer,
   the microcomputer containing writing flag information that allows the microcomputer to enter into a writing mode to execute data writing to the memory,
   the writing flag information having been already set for an initial data writing before the microcomputer is initially assembled in the electronic control device,
   the writing flag information being cleared when the initial data writing is completed,
   the writing flag information being then reset when determining that an external signal has been received from outside of both the microcomputer and the electronic control device so as to require an additional data writing, and
   the writing flag being then cleared when the additional data writing is completed.

2. The electronic control device according to claim 1, further comprising:
   a data signal line connected to the memory, wherein
   the data signal line is electrically connected or disconnected according to presence of the writing flag information.

3. The electronic control device according to claim 1, wherein
   the microcomputer switches a mode thereof between the writing mode and another mode according to the writing flag information.

4. The electronic control device according to claim 1, wherein
   the microcomputer enters into the writing mode every time when receipt of the electrical signal to require an additional data writing is determined.

5. The electronic control device according to claim 1, wherein the external signal received from outside of both the microcomputer and the electronic control device is received from an inspection device.

6. The electronic control device according to claim 1, wherein
   the writing flag information is stored in non-volatile memory in the microcomputer.

7. A method for writing data into an electrically rewritable memory by a microcomputer of an electronic control device, the method comprising:
   setting, in the microcomputer, writing flag information that allows the microcomputer to enter into a writing mode to execute data writing into the memory;

then installing, as part of the electronic control device, the microcomputer with the writing flag information set;

executing an initial data writing when determining presence of the writing flag information;

clearing the writing flag information when the initial data writing is completed;

resetting the writing flag information when determining that an external signal has been received from outside of both the microcomputer and the electronic control device, to thereby allow the microcomputer to enter a writing mode to execute an additional data writing; and then clearing the writing flag information when the additional data writing is completed.

8. The method according to claim 7, wherein the external signal which has been received from outside of both the microcomputer and the electronic control device is received from an inspection device.

9. A method for data writing to a rewritable memory by a microcomputer for an electronic control device, the method comprising:

designating writing flag information in the microcomputer, which has not been assembled to the electronic control device;

assembling, to the electronic control device, the microcomputer, in which the writing flag information has been already designated;

thereafter connecting an external device with the electronic control device and then determining whether the writing flag information is designated in the electronic control device;

executing an initial data writing from the external device after determining that the writing flag information is designated; and clearing the writing flag information when the initial data writing is completed.

10. The method according to claim 9, further comprising:

after the clearing the writing flag information, disconnecting the external device from the electronic control device, thereafter connecting a certain external device with the electronic control device;

resetting the writing flag information when determining receiving an external signal, which comes from the certain external device, to thereby allow the microcomputer to execute an additional data writing; and clearing the writing flag information when the additional data writing is completed.

11. The method according to claim 9, wherein the writing flag information is stored in non-volatile memory in the microcomputer.

* * * * *